US008745275B2

(12) United States Patent
Ikeya et al.

(10) Patent No.: US 8,745,275 B2
(45) Date of Patent: Jun. 3, 2014

(54) BLADE SERVER APPARATUS

(75) Inventors: Akio Ikeya, Hiratsuka (JP); Takashi Aoyagi, Hadano (JP); Kenji Kashiwagi, Minamiashigara (JP); Naohiro Sezaki, Ebina (JP); Kazunori Nakajima, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 13/209,994

(22) Filed: Aug. 15, 2011

(65) Prior Publication Data
US 2012/0054469 A1 Mar. 1, 2012

(30) Foreign Application Priority Data
Aug. 31, 2010 (JP) ................................. 2010-193057

(51) Int. Cl.
*G06F 3/00* (2006.01)
(52) U.S. Cl.
USPC ................................................ 710/3; 712/29
(58) Field of Classification Search
USPC ............................................................ 710/3
See application file for complete search history.

(56) References Cited

U.S. PATENT DOCUMENTS

| 2005/0050356 | A1* | 3/2005 | King et al. ..................... 713/201 |
| 2005/0283673 | A1* | 12/2005 | Ode ................................. 714/31 |
| 2006/0129585 | A1* | 6/2006 | Ishiki et al. .................... 707/101 |
| 2006/0168551 | A1* | 7/2006 | Mukuno ............................ 716/5 |
| 2009/0156031 | A1* | 6/2009 | Staiger et al. ................. 439/151 |
| 2009/0164674 | A1* | 6/2009 | Noda et al. ....................... 710/30 |
| 2010/0064111 | A1* | 3/2010 | Kunimatsu et al. ........... 711/161 |
| 2010/0229067 | A1* | 9/2010 | Ganga et al. .................. 714/752 |
| 2011/0016201 | A1 | 1/2011 | Ishiki et al. |

FOREIGN PATENT DOCUMENTS

| JP | 2010-009628 | 1/2010 |
| JP | 2010-079467 | 4/2010 |

* cited by examiner

*Primary Examiner* — Henry Tsai
*Assistant Examiner* — John Roche
(74) *Attorney, Agent, or Firm* — Foley & Lardner LLP

(57) ABSTRACT

A blade server apparatus including a plurality of server modules, a backplane for mounting the plurality of server modules thereon, and an SMP coupling device having wiring lines to SMP couple the plurality of server modules. Each of the server modules has one or more processors controlled by firmware and a module manager for managing its own server module, the module manager has an ID determiner for informing each processor of a processor ID, each processor has a processing unit and an SMP virtual connecting unit for instructing ones of wiring lines of the SMP coupling device through which a packet received from the processing unit is to be transmitted, and an ID converter for converting the processor ID and informing it to the SMP virtual connecting unit is provided within the firmware.

3 Claims, 11 Drawing Sheets

FIG.5

|  | ID CONVERSION TABLE FOR 8-CONNECTION SMP TYPE | | | | | | | |
|---|---|---|---|---|---|---|---|---|
| ID ISSUED FROM MODULE MANAGER | #0 | #1 | #2 | #3 | #4 | #5 | #6 | #7 |
| ID INFORMED TO SMP VIRTUAL CONNECTOR | #0 | #1 | #2 | #3 | #6 | #7 | #4 | #5 |

BLADE SERVER APPARATUS

INCORPORATION BY REFERENCE

The present application claims priority from Japanese application JP2010-193057 filed on Aug. 31, 2010, the content of which is hereby incorporated by reference into this application.

BACKGROUND OF THE INVENTION

The present invention relates to a blade server apparatus which can form a high-performance server by tightly coupling a plurality of blade server modules, and more particularly, to a blade SMP server apparatus which employs a symmetric multi-processing (SMP) system.

As a known technique of the present invention, a technique for SMP coupling a plurality of blade server modules via a backplane is disclosed in JP-A-2010-009628 (the counterpart US Publication of which is US2011/0016201). A technique for obtaining physical SMP coupling according to a logical SMP arrangement by providing a removable SMP coupling apparatus which mounts blade server modules in place of wiring lines on a backplane is disclosed in JP-A-2010-079467.

In order to design a server apparatus of an SMP arrangement including a plurality of server modules, it is necessary to consider various restrictions. For example, when a server apparatus is designed to simultaneously satisfy a restriction based on a processor architecture and a restriction based on apparatus specifications, the wiring length of the SMP coupling apparatus disclosed in JP-A-2010-079467 becomes much longer, which may, in some cases, deteriorate a signal transmission quality.

This will be explained in detail in connection with a specific example with use of FIGS. 6 to 11.

With respect to the first restriction, connection destinations of processors to be SMP coupled are restricted, in some cases, depending upon a processor architecture to be used. This example is shown in FIG. 6. The number of processors 400 to be SMP coupled in FIG. 6 can be selected from 2, 4 or 8. Each of the processors 400 includes an SMP virtual connecting unit 410 or SMP virtual connector and a processing unit 420 and receives a processor ID from an ID setting circuit 500 outside of the processor. The processors are connected by wiring lines 600. Although only typical ones of the wiring lines are denoted by reference numeral 600 in FIG. 6, all the thick lines wired between the processors are actually denoted by reference numeral 600. The processing unit 420 delivers a packet 700 shown in FIG. 7 to the processor 400. The packet 700 contains a data packet 720 and a destination processor ID 710. The SMP virtual connecting unit 410 instructs the destination packet to use one or ones of the wiring lines 600. At this time, in order to achieve efficient data transmission, the SMP virtual connecting unit 410 has a function of instructing the destination packet to use one or ones of the wiring lines in such a manner that packets are not simultaneously concentrated on a specific wiring line. According to the processor architecture, however, a change in a relationship between the processor ID and the wiring line causes the function not to be lost, which results in that packets are concentrated on a specific wiring line, thus deteriorating the performance. To avoid this and to get the best performance of SMP coupling, there exists, for the processor ID, such a restriction that the wiring lines 600 are required to be connected as shown in FIG. 6.

The word "processor" as used herein refers to a physical single piece as a processor chip, and even a multi-core processor currently as its mainstream is regarded as a single piece.

With respect to the second restriction, the numbering method of the ID numbers may, in some cases, be restricted by the specifications of the server apparatus or the like. This example is shown in FIGS. 8 to 11. FIG. 8 shows an example of arrangement of a server apparatus including 4 of the processors 400 SMP coupled, and FIG. 9 is its mounting example. In the examples, constituent elements denoted by the same reference numeral are the same constituent elements and have the same function. A casing 1 of the server apparatus includes two server modules 10, a backplane 20, a management unit 30, and an SMP coupling device (for four wiring lines) 40. The management unit has an intermodule execution presence/absence instruction acceptor 31 for receiving an instruction of presence or absence of an SMP execution between blades and a trouble information collector 32. The server module 10 has 2 of the processors 400 and a module manager 300, and the module manager 300 has an ID determiner 310 and a trouble detector 320. The module manager 300 informs each processor 400 of a processor ID determined by the ID determiner 310. Meanwhile, the trouble detector 320 receives the processor ID, and indicates a physical processor position, for example, upon occurrence of a trouble so as to have a function of securing maintainability. For this reason, there exists such a restriction that, as an apparatus requirement, the processor IDs is required to be defined to be arranged as #0, #1, #2 and #3 in a physical order sequentially from the left side of FIG. 8 (sequentially from left and sequentially from top in the mounting example of FIG. 9).

Since the processor ID is uniquely determined by the second restriction and a relationship between the ID and connection destination is determined by the first restriction in this way, the connection destinations of substrate wiring lines of the SMP coupling device (for 4 connection) 40 are uniquely determined. When substrate wiring lines are designed so as to fit these restrictions, the wiring length of a longest wiring line 41 becomes nearly equal to a mounting pitch 2 of the server module 10 in FIG. 9.

When the same restrictions are applied to SMP coupling of 8 processors, a problem takes place. FIG. 10 shows an example of arrangement of a server apparatus having 8 of the processors 400 SMP coupled, and FIG. 11 is its mounting example. Constituent elements denoted by the same reference numeral have the same function. Differences between FIGS. 8 and 9 lie in that 4 of the server modules 10 are mounted and an SMP coupling device (for 8 connection) 50 is provided. Explanation of constituent elements having the same construction and function as those in FIGS. 8 and 9 and already explained is omitted In this case, there exists such a restriction that, as an apparatus requirement, processor IDs are required to be defined to be arranged as #0, #1, #2, . . . , and #7 in a physical processor order sequentially from left of FIG. 10 (sequentially from left and sequentially from top in the mounting example of FIG. 11).

Since the processor ID is uniquely determined by the second restriction and the relationship between the ID and connection destination is determined by the first restriction in this way, the connection destinations of substrate wiring lines of the SMP coupling device (for 8 connection) 50 are uniquely determined. When the substrate wiring lines are designed so as to fit these restrictions, the wiring length of a longest wiring line 51 becomes about three times the mounting pitch 2 of the server module 10 in FIG. 11.

When design is made so as to fit these restrictions simultaneously in this way, there may in some cases, occur such a situation that the wiring length of the 8-connection type SMP coupling device becomes 3 times longer than that of the 4-connection type SMP coupling device and a signal transmission quality for the SMP coupling is remarkably deteriorated.

In this connection, even when the substrate is made of an expensive ultra-low-loss material, the expensive substrate can only provide characteristics about 2 times as good as a general-purpose substrate material as its limit. That is, even if such a low-loss material is used, length for wiring can be twice lengthened. Thus, it is insufficient to only employ such an ultra-low-loss material for the substrate of the 8-connection type SMP coupling device 50 and it becomes necessary to employ the ultra-low-loss material even for the substrate of the server module 10. In this case, since the cost of the server module is increased, the employment of the ultra-low-cost material becomes costly for a lower-level arrangement such as a case of no SMP coupling or a case of 4-connection type SMP coupling.

Since the 8-connection type SMP coupling as a maximum arrangement provides a smallest operational margin from the viewpoint of signal transmission quality, most detailed evaluation is required upon its development. On the other hand, in the case of the aforementioned highest-level arrangement, in many cases, much time is required for firmware development and constituent element acquirement, the completion of a test apparatus for evaluation comes last, and evaluation of the highest-level arrangement is, in some cases, started after shipping of the lower-level arrangement. Problems based on the evaluation are picked up most frequently upon evaluation of the smallest-operational margin arrangement For this reason, there is a risk that problem pickup becomes late and thus this leads to a cost increase in a broad sense.

SUMMARY OF THE INVENTION

An object of the present invention is to provide a blade server apparatus which includes a plurality of server modules, a backplane for mounting the plurality of server modules, and an SMP coupling device having wiring lines for SMP coupling between the plurality of server modules. Each of the server modules has one or more processors controlled by firmware and a module manager for managing its own server module. The module manager has an ID determiner for informing each processor of a processor ID. Each processor has a processing unit and an SMP virtual connecting unit for instructing one or ones of wiring lines of the SMP coupling device through which a packet received from the processing unit is to be transmitted. An ID converter for converting the processor ID for the SMP virtual connecting unit is provided in the firmware.

In accordance with an aspect of the present invention, even when a restriction is imposed on how to define the connection destinations of processors to be SMP coupled and to define the processor ID, a different ID can be informed to the SMP virtual connecting unit independently of the restricted processor ID and thus the connection destination of the SMP coupling can be optimized regardless of the restriction of the ID definition. Since this can reduce the wiring length of an 8-connection type SMP coupling device, thus improving a signal transmission quality.

When a substrate of the 8-connection type SMP coupling device is made of an ultra-low-loss material of characteristics twice as good as a usual material, the server module and a 4-connection type SMP coupling device can be made of an inexpensive material with a reduced cost.

Since the wiring length of the 8-connection type SMP coupling device is twice that of the 4-connection type SMP coupling device, employment of the ultra-low-loss material having the twice characteristics causes electrical loss characteristics of the 4- and 8-connection type SMP coupling devices to become nearly equal. As a result, as long as sufficient evaluation is made with the 4-connection type SMP coupling arrangement, even when the test evaluation of the 8-connection type SMP coupling arrangement becomes late, a risk of a problem later picked up can be remarkably reduced and its development cost can be reduced in a broad sense.

Other objects, features and advantages of the invention will become apparent from the following description of the embodiments of the invention taken in conjunction with the accompanying drawings.

BRIEF DESCRIPTION OF THE DRAWINGS

FIG. 5 is an example of an ID conversion table;

DESCRIPTION OF THE EMBODIMENTS

An embodiment of the present invention will be explained with use of the attached drawings.

In the present embodiment, explanation will be made in connection with an example wherein a server apparatus employs a technique for shortening the wiring length of an SMP coupling device of an 8-connection type arrangement.

Figure 1:
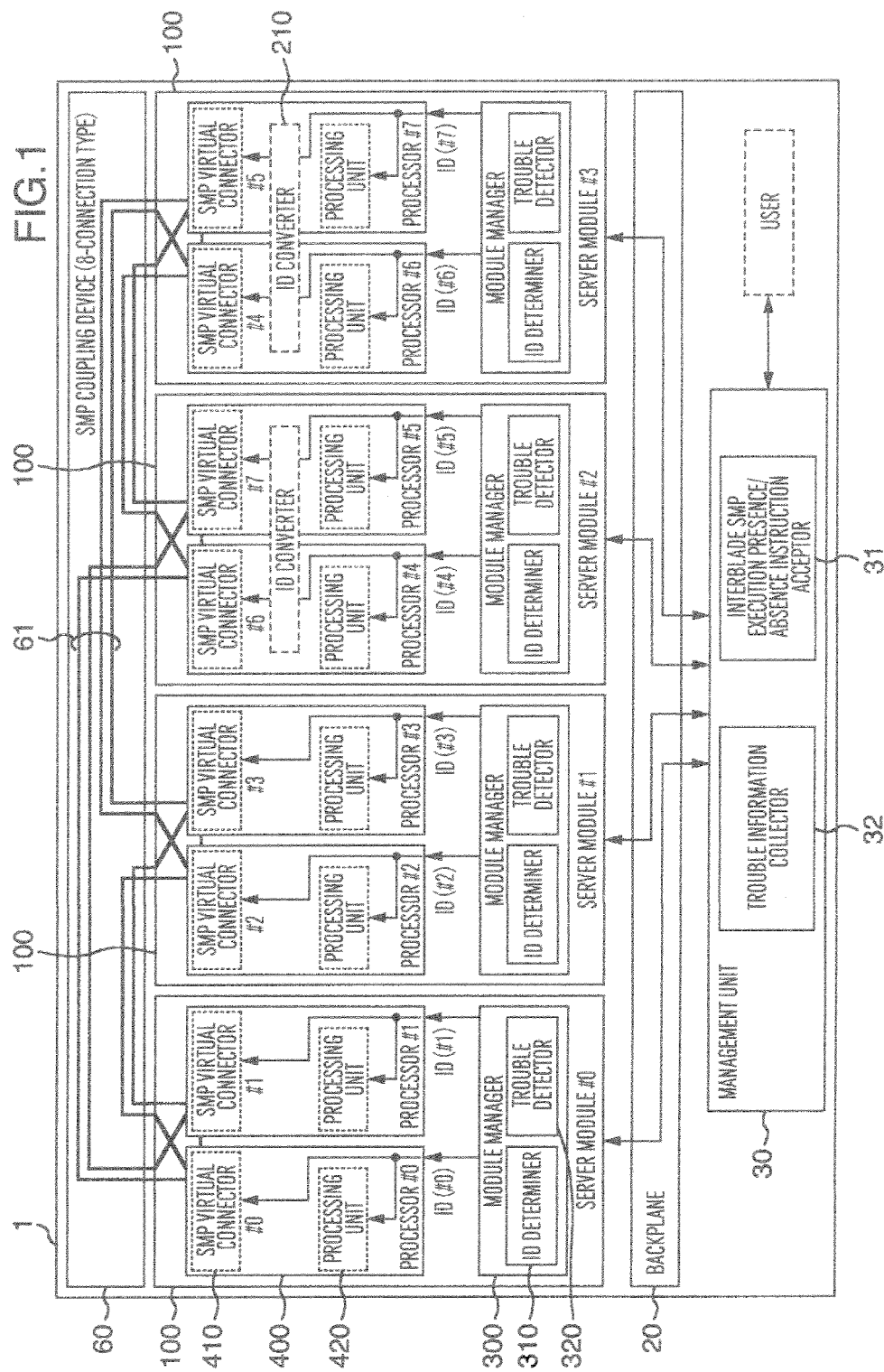
FIG. 1 shows an example of arrangement of an 8-connection type SMP coupling server apparatus in accordance with an embodiment of the present invention.
Figure 2:
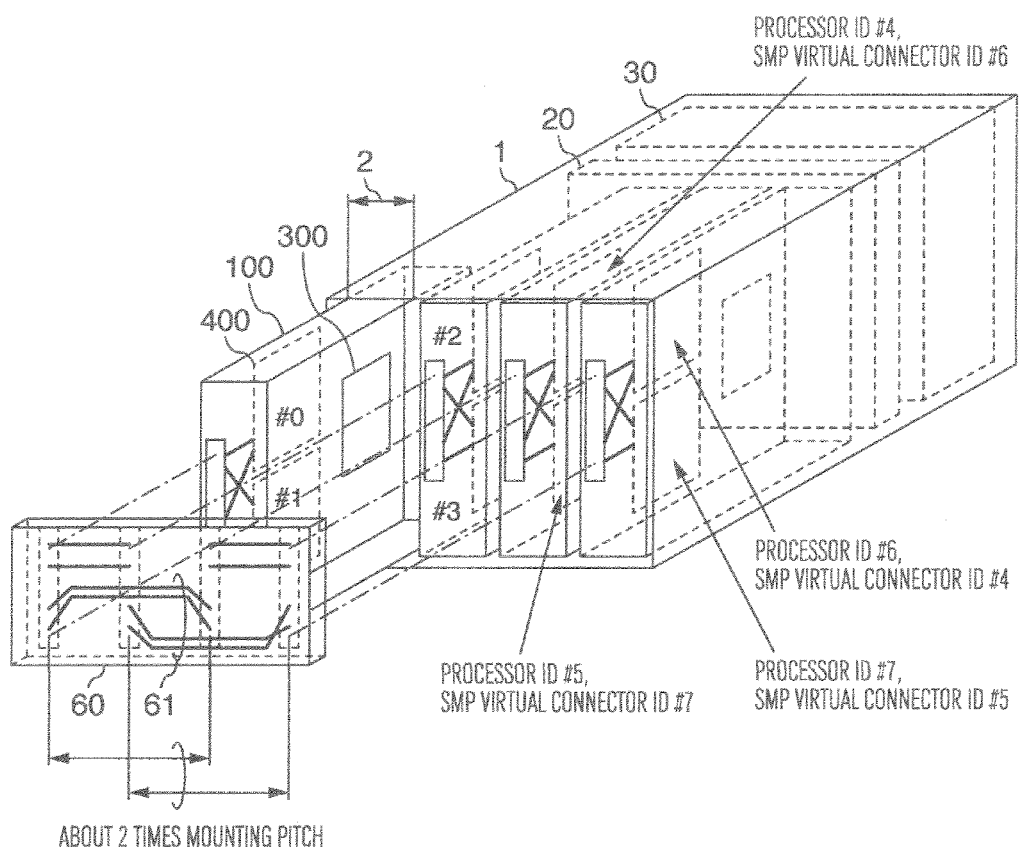
FIG. 2 is a mounting example of the 8-connection type SMP coupling server apparatus in accordance with the embodiment of the present invention.
Figure 10:
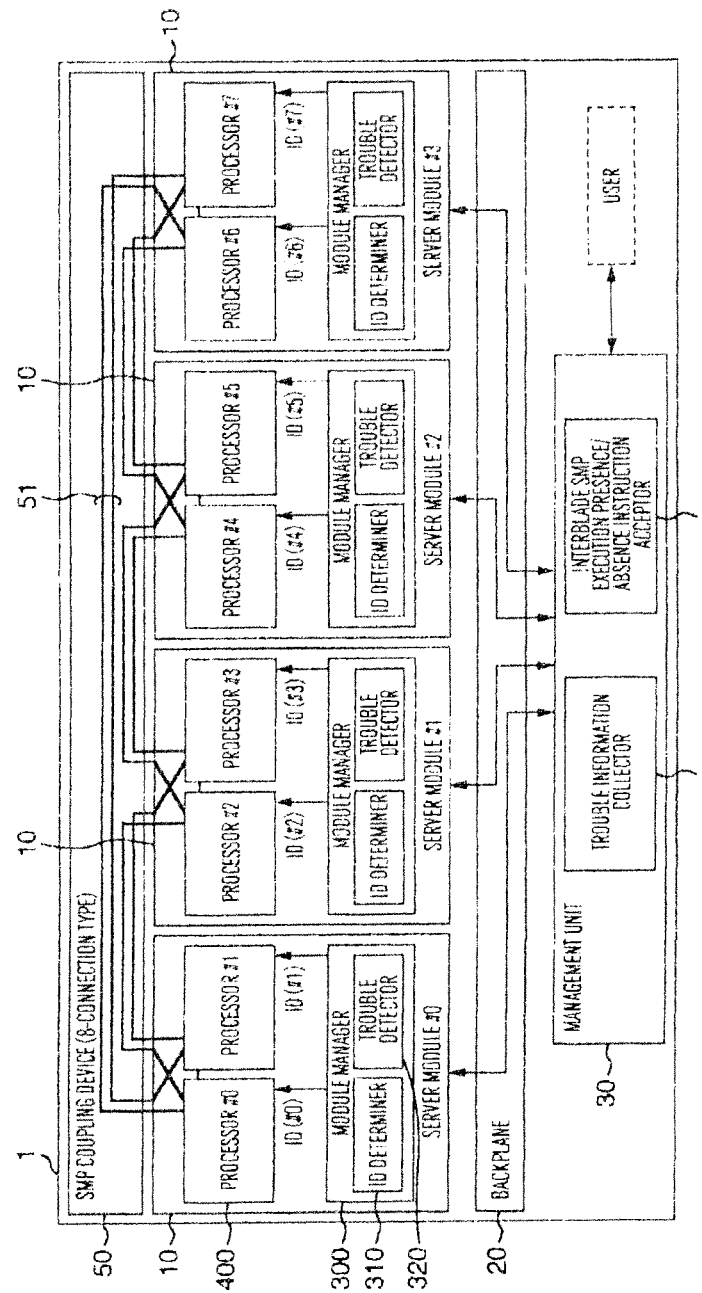
FIG. 10 an example of arrangement of an 8-connection type SMP coupling server apparatus in the prior art.
Figure 11:
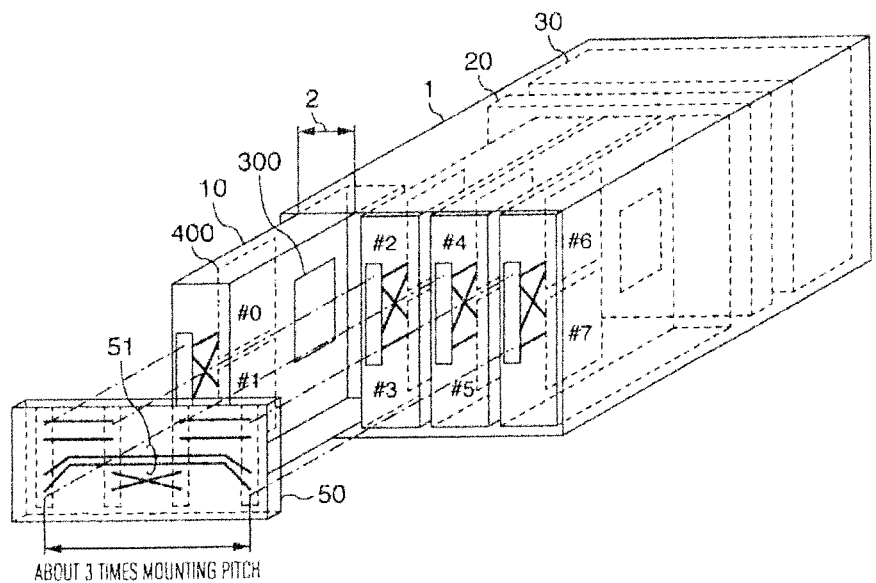
FIG. 11 is a mounting example of the 8-connection type SMP coupling server apparatus in the prior art.

FIG. 1 is an example of arrangement of an 8-connection type SMP coupling server apparatus in accordance with an embodiment 1, and FIG. 2 is a mounting example thereof Constituent elements denoted by the same reference numeral have the same function. The prior art of FIG. 10 is different from the prior art of FIG. 11 in that an ID converter 210 is provided within a server module 100 to be mounted, and the ID converter informs the SMP virtual connecting unit 410 of a processor ID after converted, the wiring length of a longest wiring line 61 of an SMP coupling device 60 is equal to nearly twice a mounting pitch 2 of server modules 100 in FIG. 2 and thus is made shorter when the wiring length of the longest wiring line is about 3 times the mounting pitch 2 in the prior art of FIG. 11. Explanation of constituent elements denoted by the same reference numeral, already explained in FIGS. 10 and 11 and having the same function will be omitted.

In order to reduce the wiring length of the longest wiring line 61 of the SMP coupling device 60, the interior of the server module 100 will be explained in detail.

Figure 3:
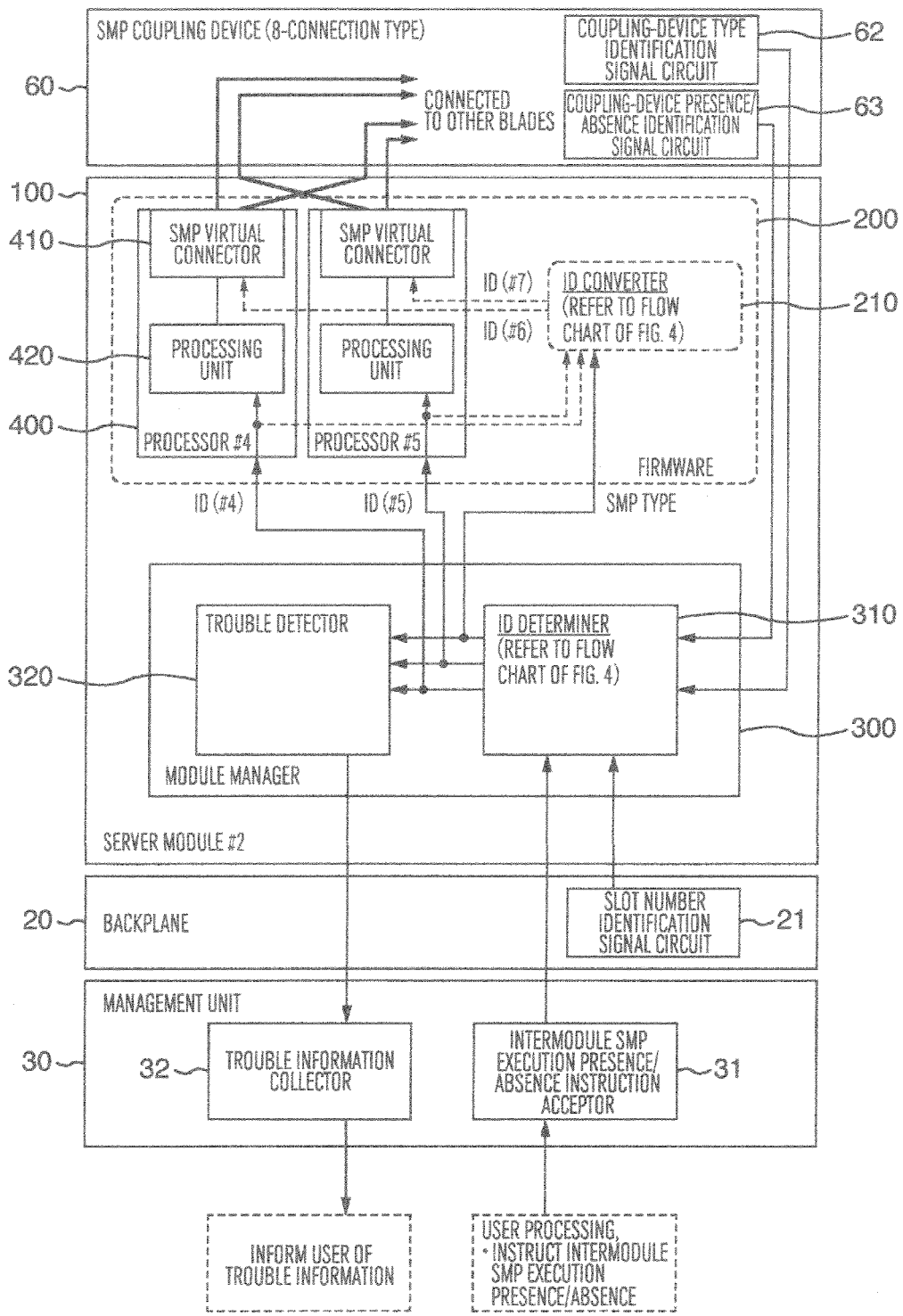
FIG. 3 is a detailed diagram of a server module #2 used in the server apparatus of FIG. 1.
Figure 6:
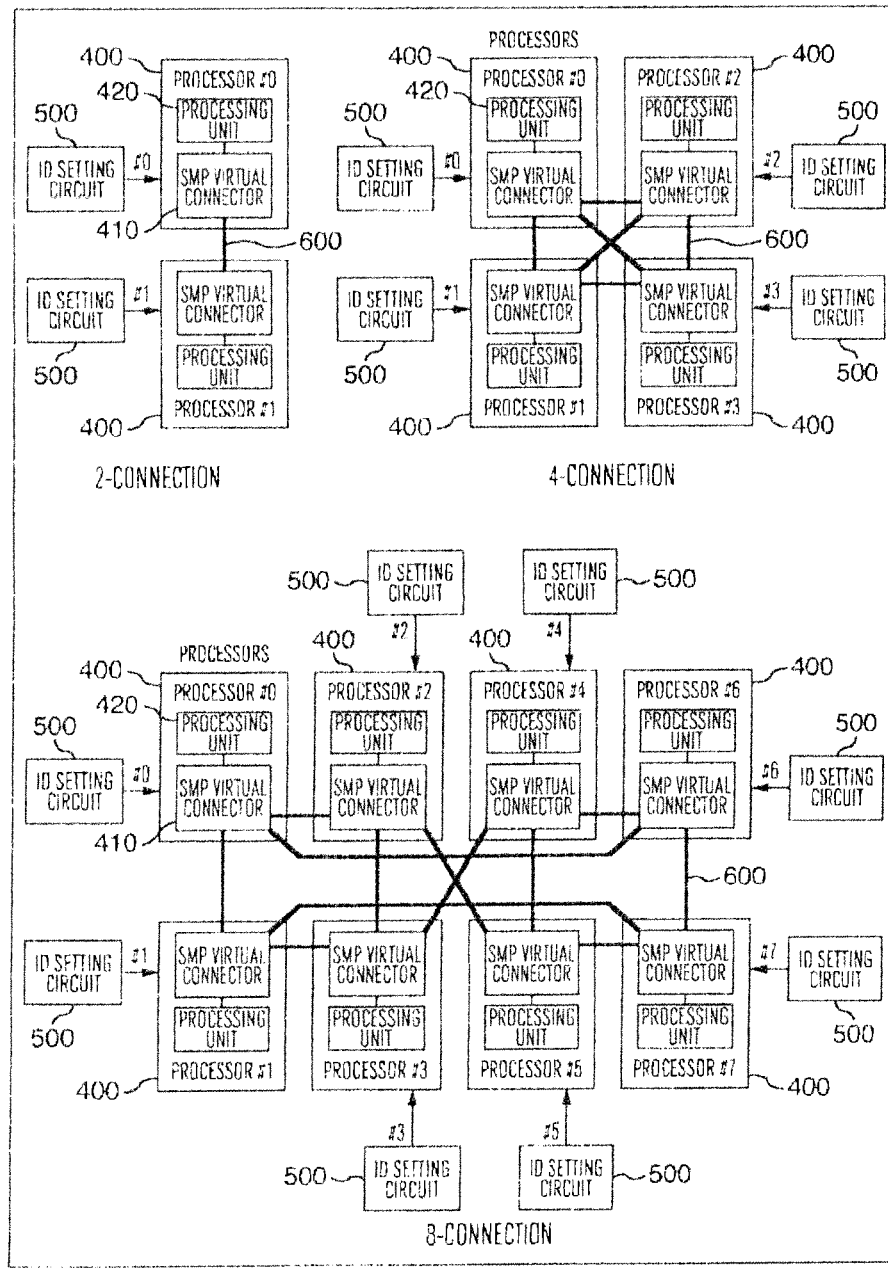
FIG. 6 is an example of restriction of processor SMP coupling.
Figure 7:
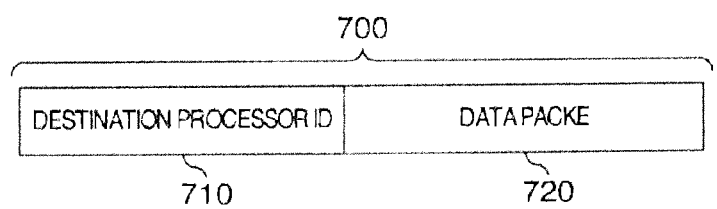
FIG. 7 is an example of a packet to be transferred between processors.

FIG. 3 is a diagram for explaining the details of a server module #2 used in the server apparatus of FIG. 1. A backplane 20 has a slot number identification signal circuit 21. A management unit 30 has an intermodule execution presence/absence instruction acceptor 31 for accepting an instruction from a user about whether to execute SMP between modules and also has a trouble information collector 32 for collecting trouble information detected by the server modules and informing the user of the trouble information. An SMP coupling device 60 has a coupling-device presence/absence identification signal circuit 63 and a coupling-device type identification signal circuit 62. A server module 100 has two processors 400 mounted thereon, a module manager 300 for managing the server module, and firmware 200 for control the processors. The module manager 300 has an ID determiner 310 for determining a processor ID and a trouble detector 320, and has a function of informing the processor 400 and the firmware 200 for controlling the processors of the processor ID and an SMP type. The firmware 200 for controlling the operation of the processor 400 has an ID converter 210, and the ID converter 210 in turn has a function of converting the processor ID and informing the SMP virtual connecting unit 410 within the processor 400 of the converted processor ID. The processor 400 has a restriction of the connection destination shown in FIG. 6 already explained. The processor ID is required to be defined as #0, #1, . . . , and #7 sequentially from the left of FIG. 1 (sequentially from the left and sequentially from the top in the mounting diagram of FIG. 2), that is, is restricted in how to be applied in ID numbering.

Figure 4:
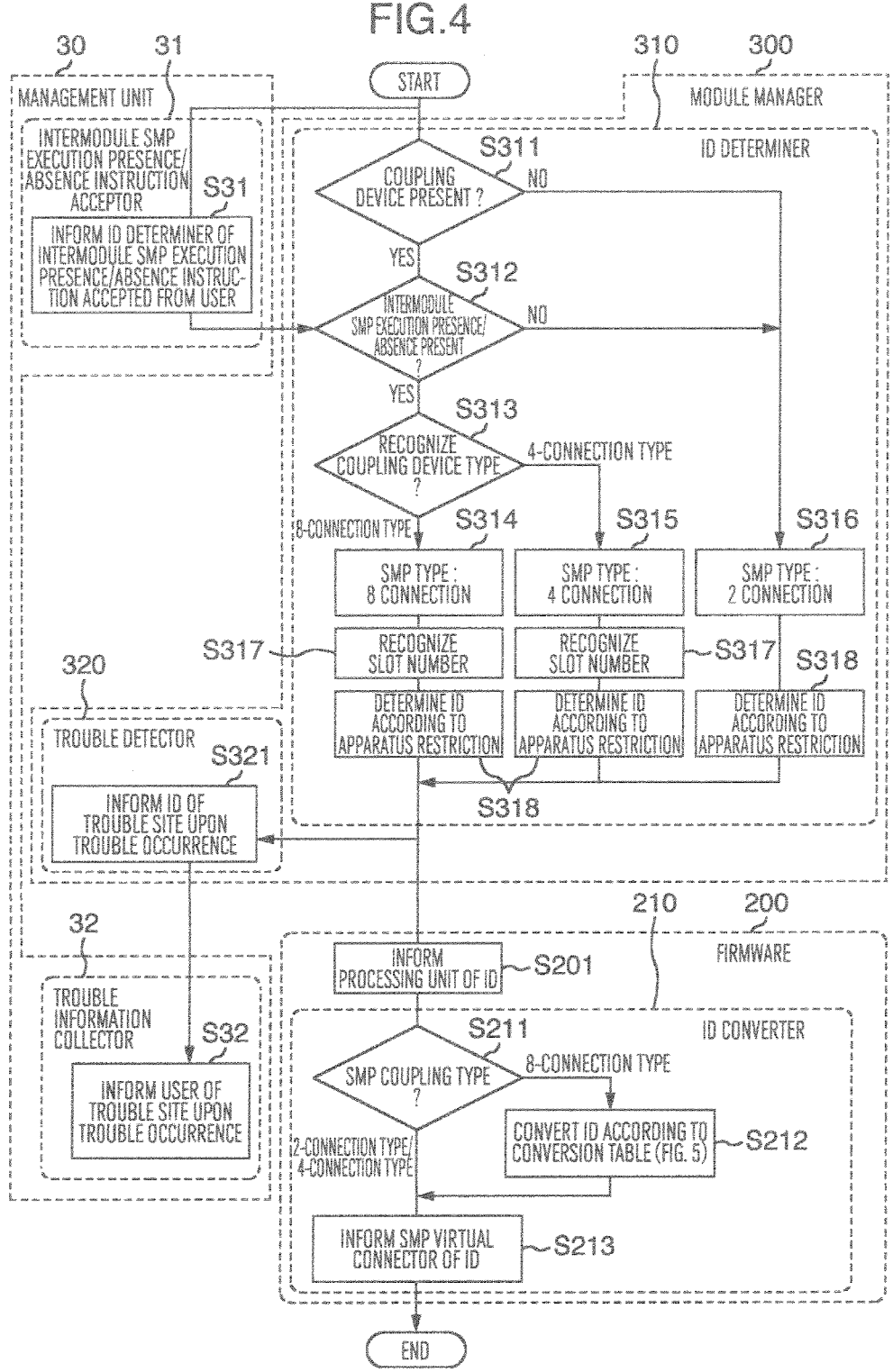
FIG. 4 is an exemplary flow chart for explaining ID conversion processing.

A flow of ID converting operation of the ID converter 210 will be explained by using FIGS. 3 and 4.

First of all, the ID determiner 310 within the module manager 300 receives a signal from the coupling-device presence/absence identification signal circuit 63 within the SMP coupling device 60 and detects presence or absence of an SMP coupling device (step S311). In the absence of an SMP coupling device ("NO" in the step S311), the ID determiner determines that an SMP type is "2 connection" (step S316.) In the presence of an SMP coupling device ("YES" in the step S311), the intermodule execution presence/absence instruction acceptor 31 within the management unit 30 informs the instruction acceptor 31 of an intermodule execution presence/absence instruction (step S31), whereby the ID determiner 310 recognizes the presence or absence of an intermodule execution (step S312). In the absence of an SMP coupling device ("NO" in the step S312), the ID determiner determines that the SMP type is "2-connection" (step S316). In the presence of and SMP coupling device ("YES" in the step S312), the ID determiner 310 detects the type of the SMP coupling device on the basis of a signal received from the coupling-device type identification signal circuit 62 in the interior of the SMP coupling device 60 (step S313). When the ID determiner detects "4-connection" in the step S313, the ID determiner determines that the SMP type is "4-connection" (step S315). When the ID determiner detects "8-connection", the ID determiner determines that the SMP type is "8-connection" (step S314). Next, when the SMP type is "4-connection" and "8-connection", the ID determiner 310 recognizes a slot number of its own mounted server module on the basis of a signal received from the slot number identification signal circuit 21 within the backplane 20 (step S317). In this way, the ID determiner the processor ID according to the ID applying method restriction (step S318). The trouble detector 320 now informs the trouble information collector 32 of the management unit 30 of the processor ID at the trouble site (step S321), and the trouble information collector 32 informs the user of the fact (step S32).

The firmware 200 then informs the processing unit of the processor ID received from the ID determiner 310 as it is (step S201). Next, the ID converter within the firmware 200 converts the processor ID (step S212) according to a conversion table of FIG. 5 when the SMP coupling type is "8-connection", and does not convert it when the SMP coupling type is "2-connection" and "4-connection". The firmware 200 informs the SMP virtual connecting unit of the thus-obtained processor ID (step S213). With respect to the conversion table of FIG. 5, more specifically, IDs #0 to #3 are left as they are, ID #4 is replaced with ID #6 and ID #5 is replaced with ID #7. In this connection, as long as a function of converting the processor ID can be obtained, a different method using not the conversion table but a function may be employed. Further, although the processor ID is converted in this example, any variable other than the processor ID may be converted so long as it conforms to the gist of the subject.

In this way, even when a restriction is imposed in how to apply the processor ID, the ID to be informed to the SMP virtual connecting unit can be converted. Thus, the wiring length of the longest wiring line 61 of the SMP coupling device (for 8 connection) 60 can be shortened from about 3 times the mounting pitch 2 of the server module 100 to about 2 times, thus improving the signal transmission quality.

Figure 8:
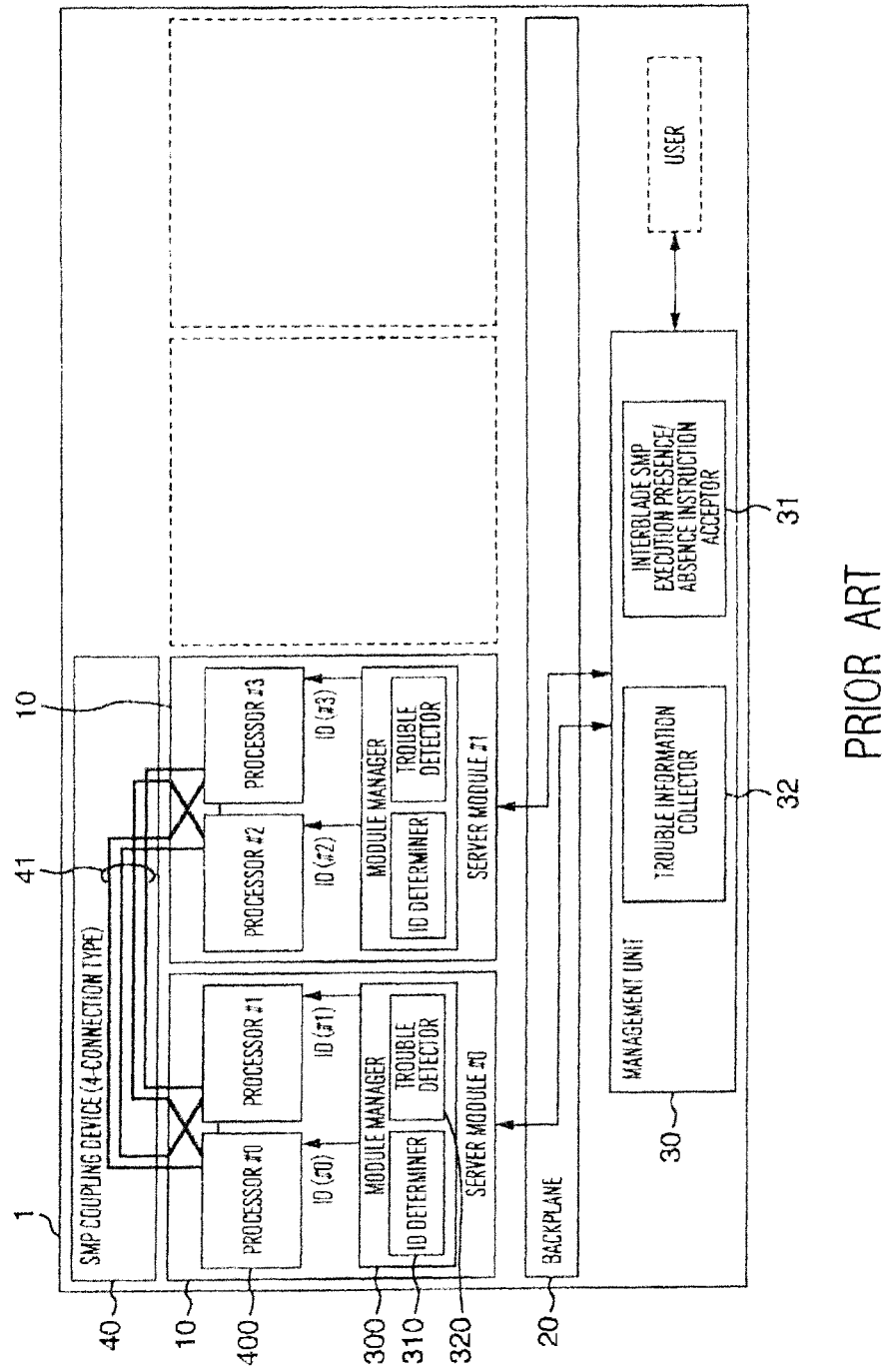
FIG. 8 is an example of arrangement of a 4-connection type SMP coupling server apparatus in the prior art.
Figure 9:
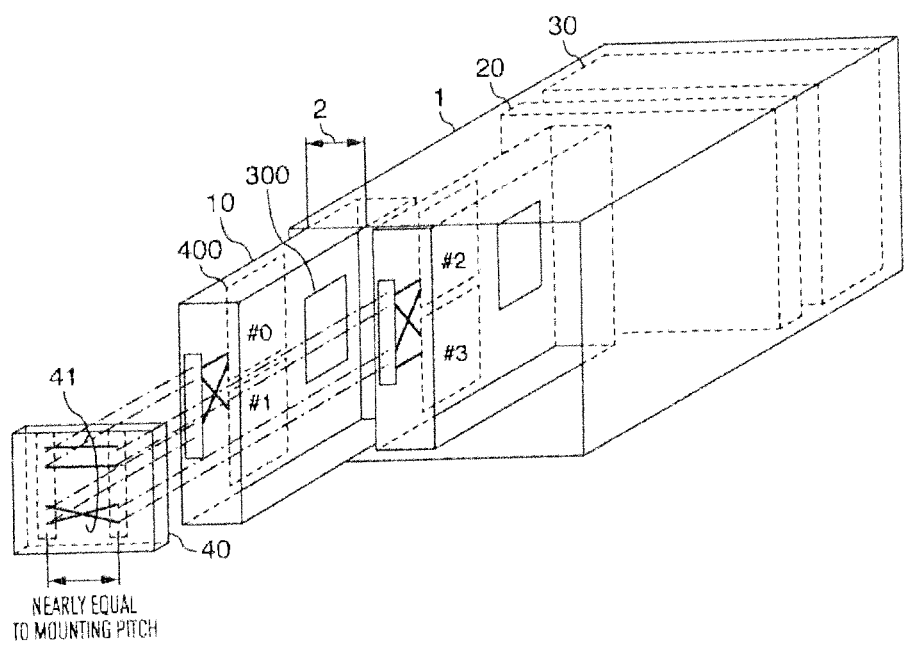
FIG. 9 is a mounting example of the 4-connection type SMP coupling server apparatus in the prior art.

Since the wiring length is about 2 times that of the 4-connection type SMP coupling server apparatus shown in FIGS. 8 and 9, employment of an expensive ultra-low-loss material having a doubly-improved electric characteristic as the material of the substrate of the SMP coupling device (8-connection type) 60 enables such a design as to be able to a signal quality equivalent to or higher than the 4-connection and 8-connection types. For example, MEGTRON6 manufactured by Panasonic Electric Works Co., Ltd can be employed for it. With use of MEGTRON6, as the substrate material of the server module 100, such an inexpensive substrate material as to be able to secure a minimum low signal transmission quality upon SMP coupling of the 4-connection type can be selected and thus a cost can be reduced.

Since much time is required for development of firmware or the like and for acquirement of constituent elements and so on in the 8-connection type SMP as an upper-level arrangement, it is often to first develop the 4-connection type SMP as a lower-level arrangement and then to evaluate the 8-connection type SMP after development of the 4-connection type SMP. However, since the 8-connection type SMP coupling of FIG. 1 is designed to obtain a signal transmission quality equivalent to or higher than the 4-connection type SMP coupling in the present invention, a risk with a trouble to be picked up in the later evaluation of the 8-connection type SMP coupling can be remarkably reduced, so long as sufficient evaluation is done for the 4-connection type SMP coupling. Generally speaking, as the timing of the feedback of the trouble is delayed, the more the cost is increased. That is, it is preferable to promptly improve a characteristic of the apparatus as much as possible in accordance with result of such evaluation. Therefore, reduction of the trouble occurrence risk in the 8-connection type SMP coupling leads to a design cost reduction in a broad sense.

The present invention is not limited to the aforementioned embodiment but may be modified in various ways. For example, the aforementioned embodiment has been explained in detail for easy understanding of the present invention. However, the present invention is not limited to such an embodiment as to have all the arrangement already explained in the foregoing embodiment. Constituent elements of the arrangement of an embodiment can be replaced with an arrangement of another embodiment, and the arrangement of an embodiment can be added to the arrangement of another embodiment. Further, constituent elements of the arrangement of each embodiment can be added to, removed or replaced in another arrangement.

Some or all of the above arrangements, functions, processors, processing means, and so on may be provided in the form of hardware, for example, by designing them with an integrated circuit. The above arrangements, functions, and so on may be provided in the form of software by processors which interpret and execute such a program as to achieve the respective functions. Information such as programs, tables, files and so on to achieve the respective functions may be placed in a recording device such as memory, hard disk, or SSD (solid state drive) or in a recording medium such as IC card, SD card or DVD.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A blade server apparatus comprising:
a plurality of server modules;
a backplane configured to mount the plurality of server modules; and
an SMP coupling device having wiring lines for SMP coupling between the plurality of server modules, wherein
each of the server modules has two processors controlled by firmware and a module manager configured to manage its own server module;
the module manager has an ID determiner configured to inform each processor of a processor ID;
each processor has a processing unit and an SMP virtual connecting unit configured to instruct one or more wiring lines of the SMP coupling device through which a packet received from the processing unit is to be transmitted;
an ID converter configured to convert the processor ID for the SMP virtual connecting unit is provided in the firmware,
wherein the ID determiner of the module manager is configured to:
receive a number of processors of an SMP arrangement from an SMP coupling type identification signal circuit within the SMP coupling device,
receive a slot number of each server module from a slot number identification signal circuit within the backplane, and
determine a processor ID of each processor; and
wherein the ID converter is configured to:
in such a case that the number of processors is eight, convert the processor ID determined by the ID determiner to a processor ID for the SMP virtual connecting unit according to an ID conversion table and notify the SMP virtual connecting unit; and
in such a case that the number of processors is two or four, notify the SMP virtual connecting unit of the processor ID having been determined by the ID determiner without conversion.

2. The blade server apparatus according to claim 1, wherein the SMP coupling device is configured to SMP couple four of the server modules in such a manner that a longest wiring length of a wiring line SMP connected between the server modules is two times a server module mounting pitch.

3. The blade server apparatus according to claim 2, wherein an electric characteristic of a substrate material of the SMP coupling device is set to be doubly improved over an electric characteristic of a substrate material of an SMP coupling device configured to SMP couple two server modules.

* * * * *